US005955663A

United States Patent [19]

Ries-Müller et al.

[11] Patent Number: 5,955,663

[45] Date of Patent: Sep. 21, 1999

[54] METHOD OF DETECTING COMBUSTION MISFIRES

[75] Inventors: Klaus Ries-Müller, Bad Rappenau; Christian Köhler, Erligheim; Wolfgang Wimmer, Erlenbach, all of Germany

[73] Assignee: Robert Bosch GmbH, Stuttgart, Germany

[21] Appl. No.: 08/794,548

[22] Filed: Feb. 3, 1997

[30] Foreign Application Priority Data

| | | | |
|---|---|---|---|
| Feb. 2, 1996 | [DE] | Germany | 196 03 740 |
| Jul. 9, 1996 | [DE] | Germany | 196 27 540 |

[51] Int. Cl.[6] ..................... G01M 15/00

[52] U.S. Cl. ..................... 73/117.3

[58] Field of Search ..................... 73/116, 117.3, 73/35.03, 35.06, 112, 117.2

[56] References Cited

U.S. PATENT DOCUMENTS

| | | | |
|---|---|---|---|
| 5,117,681 | 6/1992 | Dosdall et al. | 73/116 |
| 5,361,629 | 11/1994 | McCombie | 73/117.3 |
| 5,377,536 | 1/1995 | Angermaier et al. | 73/116 |
| 5,377,537 | 1/1995 | James | 73/117.3 |
| 5,428,991 | 7/1995 | Klenk et al. . | |
| 5,509,302 | 4/1996 | Drexel et al. | 73/117.3 |
| 5,528,931 | 6/1996 | James et al. | 73/117.3 |
| 5,531,108 | 7/1996 | Feldkamp et al. | 73/117.3 |
| 5,726,352 | 3/1998 | Mezger et al. | 73/117.3 |
| 5,774,823 | 6/1998 | James et al. | 73/117.3 |
| 5,789,658 | 8/1998 | Henn et al. | 73/116 |

FOREIGN PATENT DOCUMENTS

| | | |
|---|---|---|
| 4138765 | 7/1992 | Germany . |

*Primary Examiner*—Richard Chilcot
*Assistant Examiner*—Eric S. McCall
*Attorney, Agent, or Firm*—Walter Ottesen

[57] ABSTRACT

A first signal imaging nonuniformities in the rotational movement of the crankshaft is provided and corrective values are formed and successively changed for each cylinder individually and specifically for each load/rpm range of a plurality of load/rpm ranges until a predetermined condition is satisfied. The corrective value of the first one of the load/rpm ranges wherein the predetermined condition is satisfied is logically coupled to the first signal also in the remaining ones of said the ranges so long until the condition is also satisfied in the remaining ones of the ranges to thereby form a second signal less influenced by the nonuniformities than the first signal. A misfire is then detected when the second signal crosses over a reference value.

12 Claims, 4 Drawing Sheets

FIG. 3a
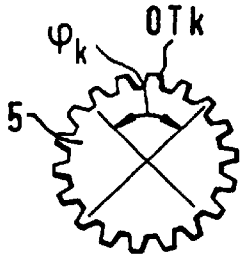
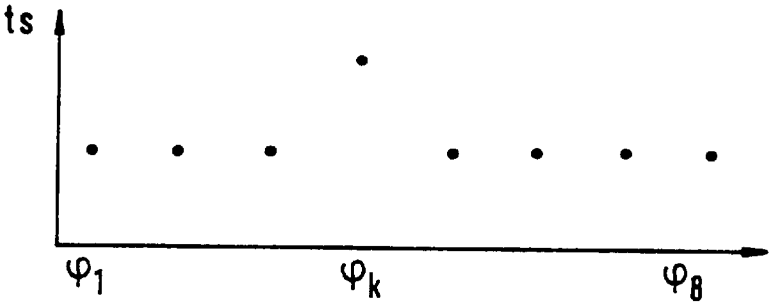
FIG. 3b
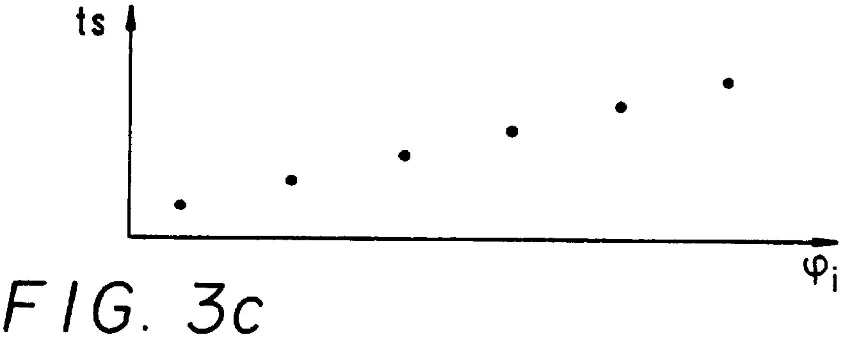
FIG. 3c
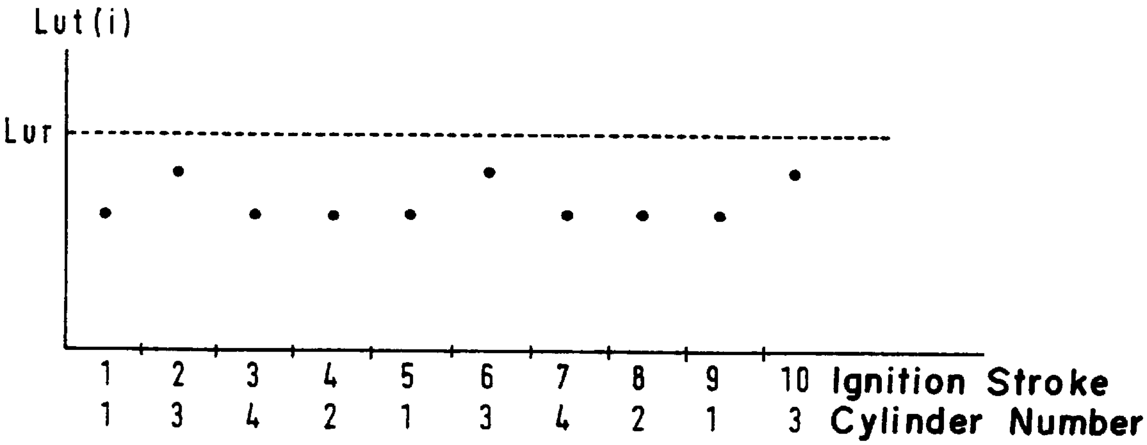
FIG. 4

METHOD OF DETECTING COMBUSTION MISFIRES

FIELD OF THE INVENTION

The invention relates to a method for detecting combustion misfires in an internal combustion engine as utilized for powering motor vehicles.

BACKGROUND OF THE INVENTION

Combustion misfires lead to an increase of toxic substances emitted during operation of the engine and can, in addition, lead to damage of the catalytic converter in the exhaust-gas system of the engine. A detection of combustion misfires in the entire rpm and load ranges is necessary to satisfy statutory requirements as to onboard monitoring of exhaust-gas relevant functions. In this context, it is known that, during operation with combustion misfires, characteristic changes occur in the rpm curve of the engine compared to normal operation without misfires. Normal operation without misfires and operation with misfires can be distinguished from a comparison of these rpm curves.

A method operating on this basis is already known and disclosed in German patent publication 4,138,765 which corresponds to U. S. patent application Ser. No. 07/818,884, filed Jan. 10, 1992, now abandoned.

In this known method, a crankshaft angular region which is characterized as a segment is assigned to a specific region of the piston movement of each cylinder. The segments are realized, for example, by markings on a transducer wheel coupled to the crankshaft. The segment time in which the crankshaft passes through this angular region is dependent, inter alia, upon the energy converted in the combustion stroke. Misfires lead to an increase of the segment times detected in synchronism with the ignition. According to the known method, a criterion for the rough running of the engine is computed from the differences of the segment times. In addition, slow dynamic operations such as the increase of the engine rpm for a vehicle acceleration are mathematically compensated. A rough-running value which is computed in this way for each ignition, is likewise compared ignition-synchronously to a predetermined threshold value. Exceeding this threshold value is evaluated as a misfire. The threshold value is dependent, as may be required, from operating parameters such as load and engine speed (rpm).

The reliability of the method is dependent decisively upon the precision with which the rpm of the crankshaft can be determined from the segment times. The segment time determination is dependent upon the accuracy with which the markings can be produced on the transducer wheel during manufacture. These mechanical inaccuracies can be mathematically eliminated. For this purpose, it is known from U.S. Pat. No. 5,428,991 to form, for example, three segment times per crankshaft revolution during overrun operation. One of the three segment times is viewed as a reference segment. The deviations of the segment times of the two remaining segments to the segment time of the reference segment are determined. From the deviations, corrective values are so formed that the segment times are the same with respect to each other. These segment times are determined in overrun operation and are logically coupled to the corrective values.

Segment times can be determined in normal operation outside of overrun operation and can be logically coupled to the corrective values. Deviations of these segment times are therefore independent of manufacturing accuracies of the transducer wheel and indicate other causes.

When misfires are recognized from the detected rpm trace, then additional influences on the rpm are to be considered which are not caused by misfires. An example of such influences to be considered are torsion vibrations which are superposed on the rotational movement of the crankshaft. These occur primarily at high rpm during fired operation and lead to a systematic increase or decrease of the segment times of individual cylinders so that the misfire detection is made more difficult. For this reason, and also for differences between individual engines (caused by wear or manufacturing inaccuracies), a base noise in the form of a spread of the segment times remains which cannot be attributed to misfires. Actual misfires are that much more difficult to distinguish from this base noise the fewer individual misfires act upon the rpm of the crankshaft. The reliability of the misfire detection therefore drops with an increase in the numbers of the cylinders of the engine and with increasing rpm as well as with decreasing load.

SUMMARY OF THE INVENTION

With this background, it is an object of the invention to provide a method which further improves the reliability of misfire detection for internal combustion engines having a high number of cylinders even at high rpms and low loads and which makes possible a rapid as well as a precise adaptation of the misfire detection to differences which are individual to an engine.

The method of the invention is for detecting combustion misfires in a multi-cylinder internal combustion engine and includes the steps of: providing a first signal imaging nonuniformities in the rotational movement of the crankshaft; forming and successively changing corrective values for each cylinder individually and specifically for each load/rpm range of a plurality of load/rpm ranges until a predetermined condition is satisfied; logically coupling the corrective value of the first one of the load/rpm ranges wherein the predetermined condition is satisfied to the first signal also in the remaining ones of the ranges so long until the condition is also satisfied in the remaining ones of the ranges to thereby form a second signal less influenced by the nonuniformities than the first signal; and, detecting a misfire when the second signal crosses over a reference value.

An essential element of the solution with respect to the accuracy of the adaptation is defined by the determination of corrective values during fired operation for individual cylinders that is, during normal operation outside of overrun operation. A further essential element with respect to the rapidity of the adaptation is provided by the two-stage adaptation which, in the first stage, supplies a rapid adaptation of the misfire detection to the differences individual to an engine and, in the second stage, a precise adaptation of the misfire detection to the differences individual to an engine.

In one embodiment of the invention, the detection sensitivity of the misfire detection is adjusted in dependence upon the two adaptation stages.

The method can be advantageously applied separately from the misfire detection when a high resolution of the rpm detection is needed.

BRIEF DESCRIPTION OF THE DRAWINGS

The invention will now be described with reference to the drawings wherein:

FIGS. 3*a* and 3*b* show the known principle for forming segment times as the basis of a measure or criterion for the rough running of the engine on the basis of rpm measurements;

FIG. 3*c* shows the influence of the changes in rpm on the detection of time durations ts;

FIG. 4 shows the influence of torsion vibrations on the determination of the rough-running values;

DESCRIPTION OF THE PREFERRED EMBODIMENTS OF THE INVENTION

Figure 1:
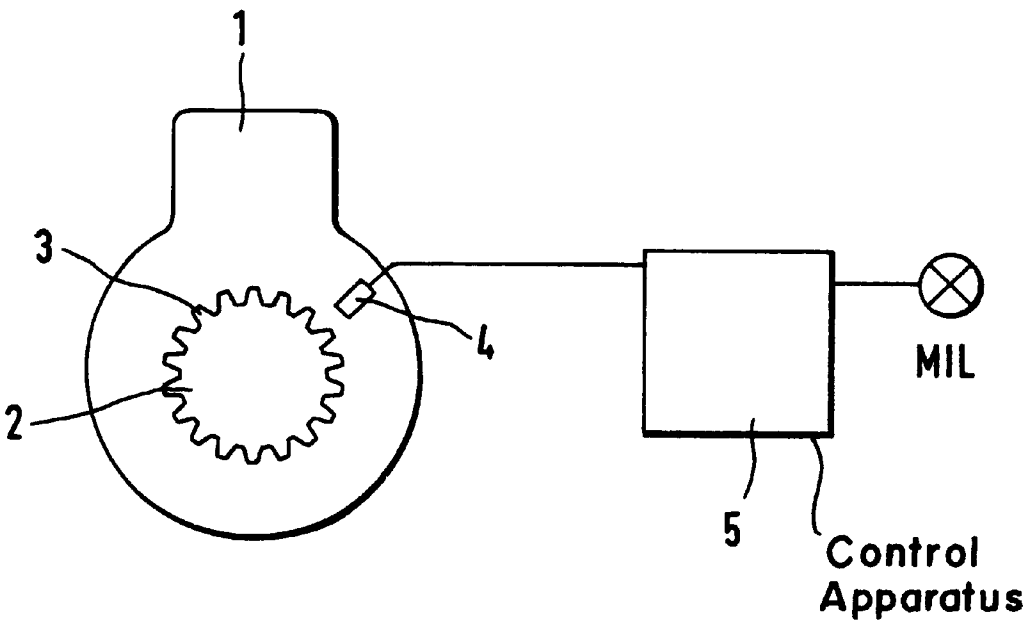
FIG. 1 is a schematic representation of an engine to show the setting in which the method of the invention is applied.

FIG. 1 shows an engine 1 having an angle transducer wheel 2 having markings 3 as well as a sensor 4 and a control apparatus 5. The angle transducer wheel is coupled to the crankshaft of the internal combustion engine and the rotational movement thereof is converted into an electrical signal with the aid of the angle sensor 4 realized as an inductive sensor. The periodicity of the electrical signal defines an image of the periodic passing of the markings 3 at the angle sensor 4. The time duration between an increase and a decrease of the signal level therefore corresponds to the time in which the crankshaft has rotated further over an angular region corresponding to the extent of the marking.

Figure 2:
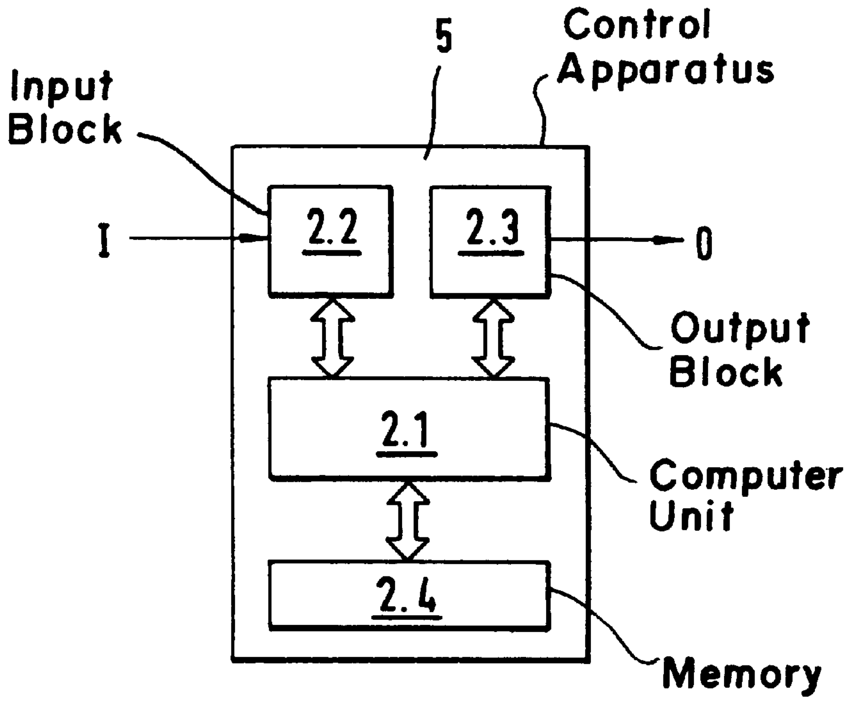
FIG. 2 is a schematic of a computer suitable for carrying out the method of the invention.

Control apparatus 5 is realized as a computer and these time durations are processed therein to a measure or criterion Lut for the rough running of the engine. An example of a Lut computation is presented below. The computer used for this purpose can, for example, be configured as shown in FIG. 2. A computer unit 2.1 negotiates between an input block 2.2 and an output block 2.3 while using programs and data stored in a memory 2.4.

FIG. 3*a* shows a subdivision of the angle transducer wheel into four segments wherein each segment has a predetermined number of markings. The marking OTk is assigned to that top dead center of a piston movement of the k-th cylinder of an internal combustion engine (in this embodiment, an eight-cylinder engine), which lies in the combustion stroke of this cylinder. A rotational angular region $\Phi_k$ is defined about this point and extends in this embodiment over one quarter of the markings of the angle transducer wheel.

In the same manner, angular regions $\Phi_1$ to $\Phi_8$ are assigned to the combustion strokes of the remaining cylinders with a four-stroke principle being assumed wherein the crankshaft rotates twice for each complete work cycle. For this reason, the region $\Phi_1$ of the first cylinder corresponds to the region $\Phi_5$ of the fifth cylinder and so on. The angular regions, which correspond to one crankshaft revolution, can be separated from each other, can follow each other directly or can overlap each other. In the first case, markings are provided which are not assigned to any angular region. In the second case, each marking is allocated precisely to one angular region and, in the third case, the same markings can be assigned to different angular regions. Any desired length and position of the angular regions are therefore possible.

In FIG. 3*b*, the times ts are plotted in which the angular regions are passed through with the rotational movement of the crankshaft. Here, a misfire in cylinder k is assumed. The absence of torque connected with this misfire leads to an increase of the corresponding time span ts. The time spans ts then define a criterion for the rough running which is, in principle, suitable for detecting misfires. By a suitable processing of the time spans ts, the rough-running value receives the dimension of an acceleration and has an improved signal/noise ratio as has been shown empirically. The suitable processing is performed by forming the differences of mutually adjacent time spans and normalizing these differences to the third power of the time span tsi at an ignition stroke having index i.

FIG. 3*c* shows the influence of rpm changes on the detection of the time durations ts. The case of a reduction in rpm is shown as typically occurring during overrun operation of a motor vehicle. This effect becomes manifest in a relatively uniform extension of the detected times ts. To compensate for this effect, it is, for example, known to form a corrective term D for dynamic compensation and to so consider this term D that the extension effect is compensated for while the rough-running value is computed.

A rough-running value corrected in this manner for the ignition stroke i of an 8-cylinder engine can, for example, be computed in accordance with the following rule:

$$Lut(i) = \text{base term } B - \text{corrective term } K \text{ for dynamic compensation}$$

$$= \frac{ts(i+1) - ts(i)}{ts(i)^3} - \frac{((ts(i+5) - ts(i-3)/8)}{ts(i)^3}$$

The above rule generalized for z cylinders is as follows: wherein: (z)=number of cylinders of the engine.

$$Lut(i) = B - K = \frac{ts(i+1) - ts(i)}{ts(i)^3} - \frac{ts\left(i + \left(\frac{z}{2} + 1\right)\right) - ts\left(i - \left(\frac{z}{2} - 1\right)\right)}{ts(i)^3}$$

The rough-running values can also be formed in accordance with other rules. What is essential for the invention is that the rough-running values are based on an evaluation of the time-dependent trace of the rotational movement of the engine. FIG. 4 shows rough-running values which can, for example, be computed in accordance with the above rule. The rough-running values are shown for different ignition strokes i=1 to i=10 of a four-cylinder engine. Here, an increase of the segment time occurs systematically for the cylinder number 3. In the case shown, the increase in segment time is already close to the rough-running threshold value Lur. This increase can, for example, be caused by torsion vibration.

Torsion vibrations occur primarily at high rpms and lead to a systematic lengthening or shortening of the segment times of individual cylinders so that the misfire detection becomes more difficult. The allocation of these influences to the individual cylinders can be determined empirically for a specific engine type for specific load/rpm ranges so that these influences can be countered by corrective values which become incorporated in the evaluation of the segment time. The corrective values are stored in a load/rpm characteristic field.

Figure 5:
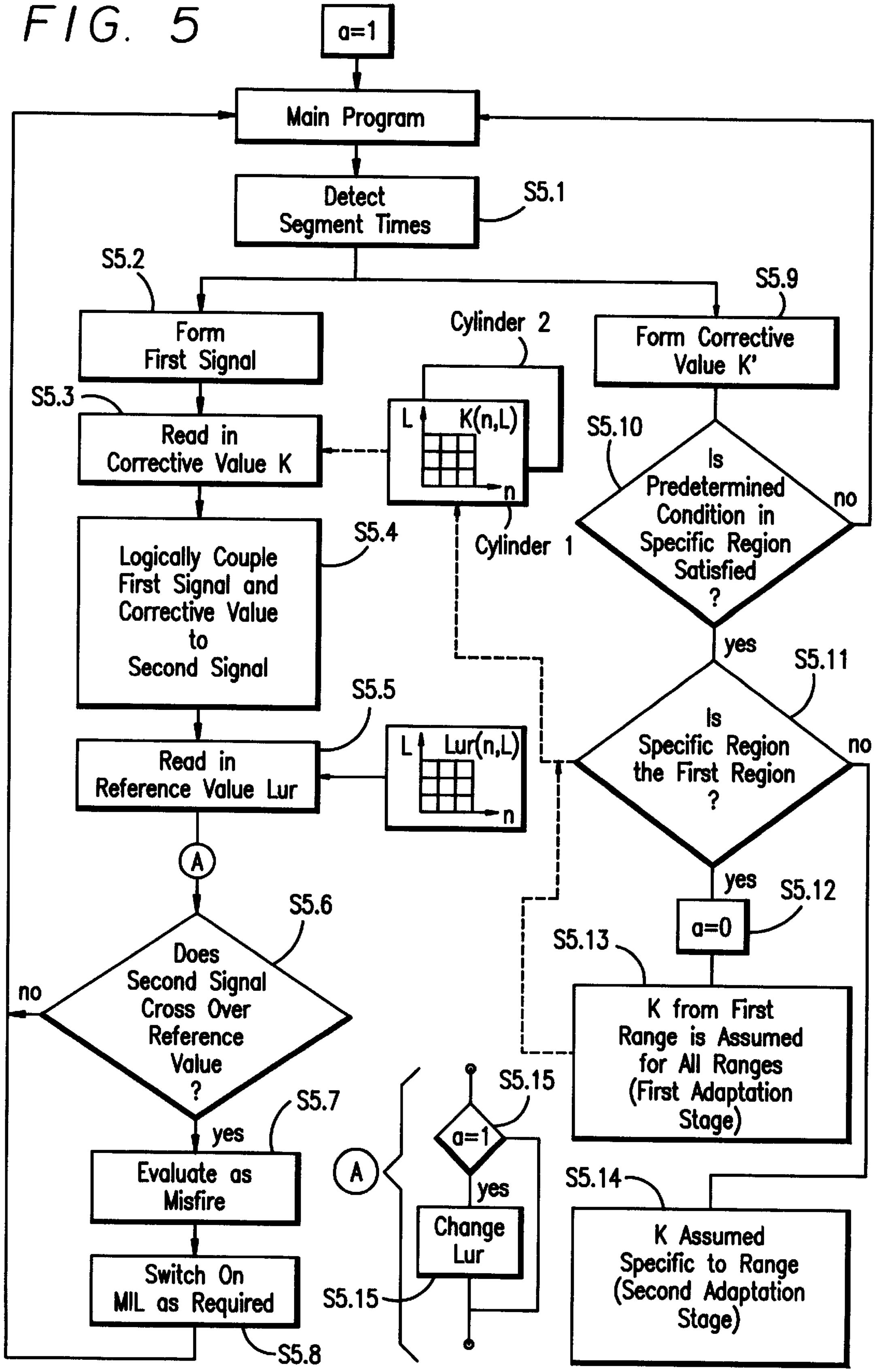
FIG. 5 shows an embodiment of the method of the invention in the context of a flowchart; and, FIG. 6 shows the structure of a characteristic field used in the embodiment of FIG. 5.

The sequence of misfire detection by utilizing corrections of this kind is shown in the left branch of FIG. 5. FIG. 5 illustrates a flowchart of an embodiment of the method of the invention for adapting the corrective values. The adaptation is here understood as being the learning of adapted corrective values.

The embodiment is cyclically called up from a higher order engine control program or main program. The variable (a), which occurs repeatedly in the flowchart, relates to an embodiment wherein the sensitivity of the misfire detection is adjusted in dependence upon the adaptation advance or learning advance. The variable (a) is set to the value 1 at the start of the engine.

The misfire detection method begins with step S5.1 wherein segment times are ignition synchronously detected and are processed in step S5.2 to a first signal in which the nonuniformities in the rotational movement of the crankshaft are imaged. In step S5.3, a corrective value for compensating the nonuniformities, which systematically occur in misfire-free operation, is read in for each cylinder individually from a load/rpm characteristic field K(L,m). The nonuniformities can, for example, be caused by torsion vibrations.

In the first method runthrough, the characteristic field values are predetermined neutral or plausible values. These values are successively converted to corrective values by repeatedly running through the method. These corrective values compensate the systematic nonuniformities, which are not caused by misfires, in the signal processing. For this purpose, in step S5.4, the corrective values are coupled with a first signal to form a second signal which is less influenced by the above-mentioned nonuniformities than the first signal.

A reference value LUR is read in from a characteristic field in step S5.5. After this step, in step S5.6, a comparison of the second signal to the reference value LUR takes place. A crossover by the second signal of the reference value is evaluated in step S5.7 as a misfire. Thereafter, in step S5.8, a fault lamp MIL is switched on as may be required, that is, for example, for a specific frequency of the occurrence of misfires.

The right branch of the flowchart of FIG. 5 is provided to adapt the corrective values K to the characteristics specific to the individual engine. Thus, in step S5.9, a corrective value K' is formed from the segment times detected ignition synchronously in step S5.1. For this purpose, the deviations of the measured segment times from the time of a reference segment can be formed. These deviations are, for example, individual to each cylinder and specific for each load/rpm range. These differences are then subjected to a dynamic correction and are, for example, standardized to a quantity by division by the reference segment time. The quantity is angularly proportional and independent of the rpm.

The segment time deviations normalized as above are lowpass filtered. The result defines the segment-specific corrective value K' which, at first, is stored as a preliminary corrective value. In step S5.10, the learning advance is checked. To some extent, the learning advance defines the deviation of the corrective value K', which had been determined to this time point, as a fictitious optimal value. As an approximation for this deviation, the difference between the filter input and output can be used. This difference becomes smaller with increasing approximation to the fictitious optimal value. As soon as this deviation is adequately small, the predetermined condition in the specific load/rpm range of an individual cylinder in step S5.10 is deemed to be satisfied.

The inquiry in step S5.11 serves to determine whether the predetermined condition was already satisfied in another load/rpm range of the same cylinder. If the actual region is the first region in which the condition is satisfied, then the first adaption stage is deemed as being completed.

Step S5.12 then sets the variable (a) to the value 0. This becomes effective for the reference value formation in advance of the step S5.6. As long as the adaptation has not reached steady state in at least one range, the reference value is changed in step S5.15 so that the misfire detection reacts with less sensitivity. If, in contrast, the adaptation is in steady state in at least one range, then a reference value is used which represents a comparatively sensitive misfire detection. The steady state condition of the adaptation is determined via the inquiry in step S5.16. Here, a=1 stands for the nonsteady state and a=0 stands for the completion of the first adaptation stage. This stage is characterized in that, in step S5.13, the corrective value K is assumed first as the first stage of the adaptation for all load/rpm ranges of a cylinder. With this coarse adaptation, coarser nonuniformities of the transducer wheel or intense torsion vibrations are compensated.

On the other hand, if the predetermined condition interrogated in step S5.10 was satisfied already in at least one range, the program branches via step S5.11 to a second adaptation stage in step S5.14 wherein the further corrective values K are assumed specific to a range. This adaptation stage can therefore also be characterized as fine adaptation, in which nonuniformities specific to a range are learned. The ranges need not fill the entire load/rpm plane but can, for example, be distributed as shown in FIG. 6.

Figure 6:
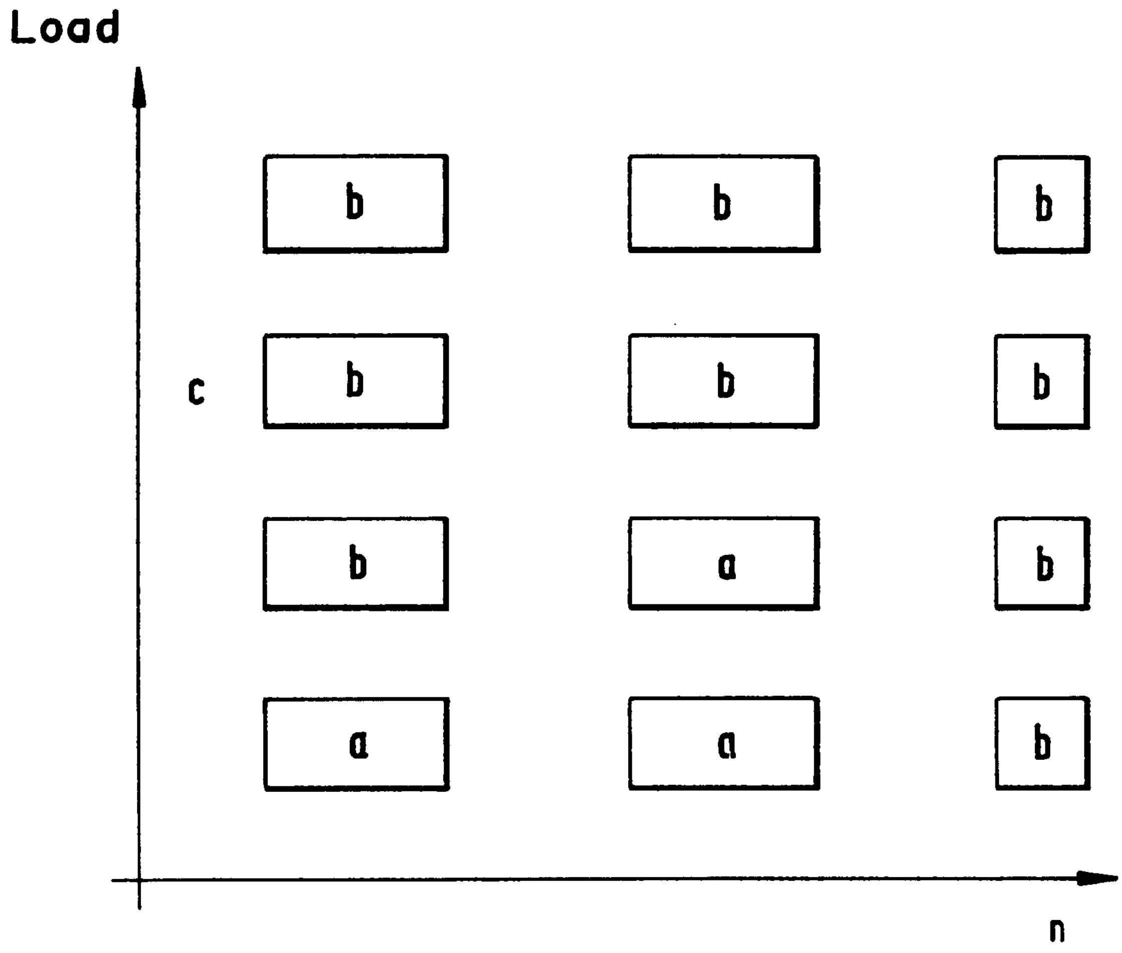

According to FIG. 6, the load/rpm plane concerns three ranges or classes of ranges. The ranges, which are identified by (a) are characterized in that they are approached relatively frequently during operation of the engine and that they are noncritical with respect to the misfire detection. This means that in these ranges, for example, only comparatively small disturbances caused by torsion vibrations and the like are to be expected. Stated otherwise, in these ranges, adaptation is only slight and the adaptation can take place rapidly because of the frequent approach. The ranges, which are identified by (b), are characterized in that the adaptation values are formed from the segment times detected in these ranges. The remaining range (c) is characterized in that the corrective values for the segment times detected there are obtained by interpolation on the basis of adaptation values from neighboring ranges (a) and/or (b). Stated otherwise, corrective values are there used on the basis of corrective values from other operating ranges.

The two-stage adaptation takes place in this example in accordance with the strategy explained below.

Range (a) is the first range in which the adaptation has reached steady state. In the first stage, the adaptation values are assumed from range (a) in all other ranges. The adaptation is, if required, corrected with respect to an already known rpm dependency. The ranges (a) can also be characterized as dominant with respect to the adaptation. An example for a range (a) can be the overrun operation in the entire rpm spectrum or even in a subinterval or several subintervals of the rpm spectrum. As overrun operation, for example, the operation with closed throttle flap applies or even an operation below a predetermined load threshold which can be constant or be dependent on rpm.

A measure for the load is, for example, a fuel base metering signal t1, which is computed proportional to cylinder charge. The fuel base metering signal t1 can be formed as an intake air quantity Q normalized to the stroke of the engine. The base metering signal t1 can be formed as t1=Q/n wherein n=rpm. The use of the overrun operation as range (a) is advantageous in view of the desired rapidity of the adaptation.

In a second stage, individual adaptation values or corrective values are formed for the remaining ranges (a) and (b). Additionally, the sensitivity of the misfire detection can be adjusted parallel to the two-stage adaptation. As long as the first adaptation stage is not yet completed, a comparatively large rough-running reference value Lur is used which corresponds to a comparatively insensitive misfire detection. As soon as the first adaptation stage is completed, a switchover to a comparatively more sensitive misfire detection takes place by utilizing lower threshold values.

In one embodiment, the corrective values are not only formed in dependence upon individual cylinders and in dependence load/rpm, but are also formed in dependence upon engine temperature.

Furthermore, a plausibility check can be made. Here, components of different load/rpm ranges, which are specific to a segment and specific to a cylinder, can be compared to each other and nonplausible deviating corrective values are not considered. Specific intervals of plausible corrective values are present which are dependent upon the type of engine. These corrective values are maintained in misfire-free operation. As an example of a plausibility check, the maintenance of these regions can be monitored.

In a further embodiment, the adaptation or the formation of the corrective values can be stopped after misfires are recognized. The adaptation or formation of the corrective values can again be activated when, thereafter, at least one specific load/rpm range was approached without occurrence of misfires. This procedure prevents the situation that the effect of misfires is learned as disturbance which can lead to the situation that misfires are no longer detected.

In FIG. 5, terminating the formation of the corrective value can be initiated, for example, by setting a misfire flag in step S5.7. Between steps S5.1 and S5.9, an inquiry can determine whether the flag is set. For a set flag, the execution of the step sequence (starting with step S5.9) in the right branch of FIG. 5 is not carried out. Stated otherwise, the corrective-value formation is stopped when misfires occur.

After stopping, the corrective value formation can again be activated when at least one specific load/rpm range (recovery range) is approached without the occurrence of misfires. In the embodiment of FIG. 5, and after the inquiry of step S5.6 has been answered in the negative, an inquiry can be made as to whether the actual values of load and rpm lie within a recovery range. When this inquiry is answered in the positive, the flag, which was set in step S5.7, is again set back. Alternatively, the set flag can be set back after not only one recovery range but several recovery ranges were driven to without the occurrence of misfires.

It is understood that the foregoing description is that of the preferred embodiments of the invention and that various changes and modifications may be made thereto without departing from the spirit and scope of the invention as defined in the appended claims.

What is claimed is:

1. A method for detecting combustion misfires in a multi-cylinder internal combustion engine having a crankshaft which performs a rotational movement during operation of the engine, the method comprising the steps of:

providing a first signal imaging nonuniformities in the rotational movement of the crankshaft;

forming and successively changing corrective values for each cylinder individually and specifically for each load/rpm range of a plurality of load/rpm ranges until a predetermined condition is satisfied;

logically coupling the corrective value of the first one of said load/rpm ranges wherein said predetermined condition is satisfied to said first signal also in the remaining ones of said ranges so long until said condition is also satisfied in said remaining ones of said ranges to thereby form a second signal less influenced by said nonuniformities than said first signal; and, detecting a misfire when said second signal crosses over a reference value.

2. The method of claim 1, wherein said first signal is formed on the basis of segment times; and, each of said segment times corresponding to that time in which the crankshaft of said engine passes through a segment defined as a pregiven rotational angular region.

3. The method of claim 2, wherein said nonuniformities in said first signal are defined as deviations of the segment times, which are detected individually for each cylinder, from a reference segment time.

4. The method of claim 3, wherein said deviations are lowpass filtered; and, said condition is deemed to be satisfied when the input and output of the lowpass filter differ from each other by less than a predetermined amount.

5. The method of claim 1, wherein said reference value is dependent upon whether said predetermined condition is satisfied at least in one of said load/rpm ranges.

6. The method of claim 5, wherein said reference value has dependency upon whether said predetermined condition is satisfied and said dependency of said reference value is so configured that the misfire detection is comparatively insensitive when said predetermined condition is not yet satisfied in at least one range and is otherwise comparatively sensitive.

7. The method of claim 1, wherein the corrective value of a selected region, in which the predetermined condition is satisfied, can also be used in other operating ranges wherein no adaptation takes place.

8. The method of claim 1, wherein said corrective values are formed not only in dependence upon an individual cylinder and on load/rpm but also upon engine temperature.

9. The method of claim 1, wherein a plausibility check of the corrective values is made; portions of different load/rpm ranges are compared to each other; corrective values are not considered when implausible deviations occur; and, said portions are specific to a segment and specific to a cylinder.

10. The method of claim 1, wherein the formation of corrective values is stopped after the detection of misfires; and, the formation of corrective values is again activated when at least a specific load/rpm range (recovery range) is approached without the occurrence of misfires.

11. The method of claim 1, wherein one load/rpm range or several load/rpm ranges correspond to overrun operation in the entire rpm spectrum or even in one or several component intervals of the rpm spectrum.

12. The method of claim 11, wherein the operation with a closed throttle flap or operation below a predetermined load threshold is deemed to be overrun operation; and, said load threshold being constant or even rpm dependent.

* * * * *